United States Patent
Iio et al.

(10) Patent No.: US 7,116,856 B2
(45) Date of Patent: Oct. 3, 2006

(54) OPTICAL SWITCH MATRIX

(75) Inventors: Shinji Iio, Musashino (JP); Masayuki Suehiro, Musashino (JP); Shin-ichi Nakajima, Musashino (JP); Yoshiyuki Asano, Musashino (JP); Chie Sato, Musashino (JP); Akira Miura, Musashino (JP); Tsuyoshi Yakihara, Musashino (JP); Shinji Kobayashi, Musashino (JP); Sadaharu Oka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 90 days.

(21) Appl. No.: 10/901,173

(22) Filed: Jul. 29, 2004

(65) Prior Publication Data

US 2005/0041913 A1 Feb. 24, 2005

(30) Foreign Application Priority Data

Aug. 21, 2003 (JP) ............................. 2003-297157

(51) Int. Cl.
*G02B 6/26* (2006.01)
(52) U.S. Cl. .............................. 385/17; 385/15; 385/16
(58) Field of Classification Search .................. 385/15, 385/16, 17
See application file for complete search history.

(56) References Cited

U.S. PATENT DOCUMENTS 6,760,504 B1 * 7/2004 Duer ............................ 385/17
6,847,756 B1 * 1/2005 Khalil et al. .................. 385/18

FOREIGN PATENT DOCUMENTS

| JP | 6-75179 | 3/1994 |
|----|---------|--------|
| JP | 8-163031 | 9/1996 |
| JP | 9-105959 | 4/1997 |
| JP | 10-308961 | 11/1998 |

OTHER PUBLICATIONS

Hiroaki Inoue et al., "An 8mm length Nonblocking 4×4 Optical Switch Array", IEEE Journal on Selected Area in Communications, vol. 6, No. 7, pp. 1262-1266 Aug. 1988.

* cited by examiner

*Primary Examiner*—Jennifer Doan
(74) *Attorney, Agent, or Firm*—Westerman, Hattori, Daniels & Adrian, LLP.

(57) ABSTRACT

A matrix optical switch that can switch the transmission path of an optical signal without requiring a driving unit for each optical switch is realized. A matrix optical switch for switching a transmission path of an optical signal by connecting plural input sides and plural output sides, respectively, comprises: a semiconductor optical waveguide substrate; a photo mask choosing system for selecting and arranging one photo mask from plural photo masks each of which has printed thereon a pattern connecting plural input sides to plural output sides; and a light source for casting output light having larger energy than a band gap of the semiconductor optical waveguide substrate onto a photon injection area between the plural input sides and the plural output sides on the semiconductor optical waveguide substrate via the selected photo mask.

13 Claims, 9 Drawing Sheets

FIG.8
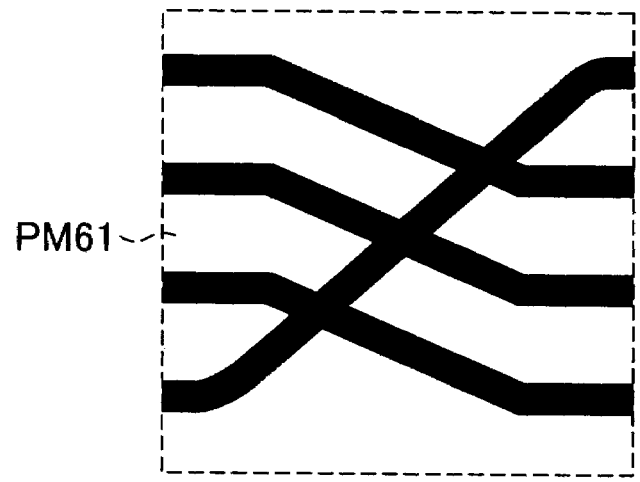
PM61
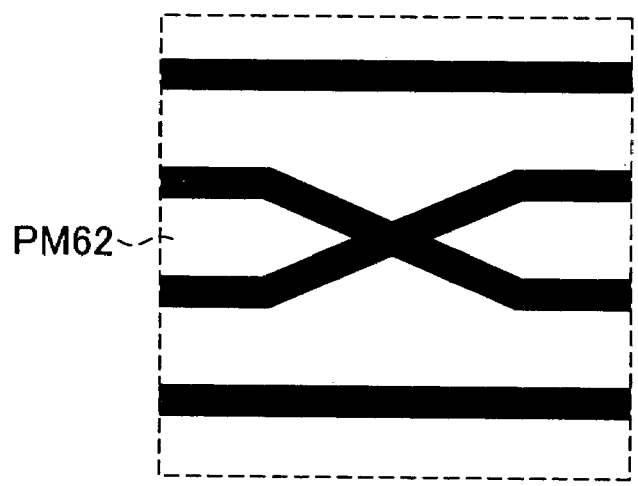
PM62
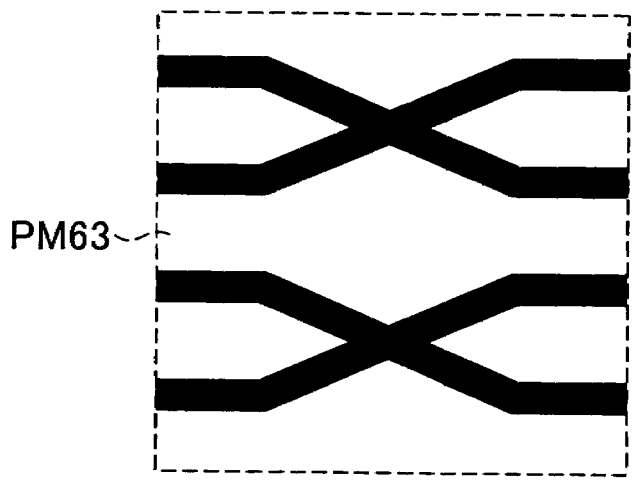
PM63

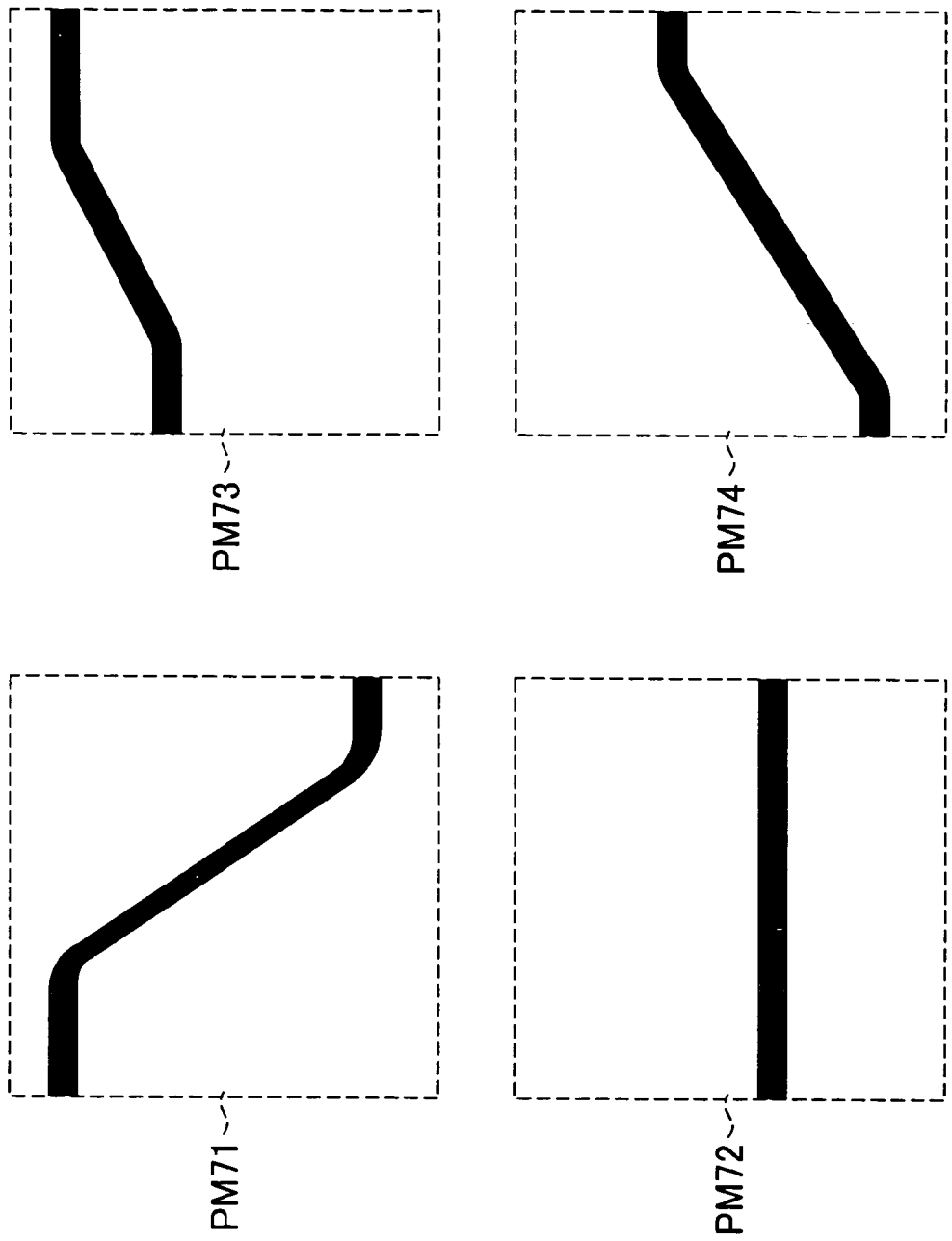

OPTICAL SWITCH MATRIX

BACKGROUND OF THE INVENTION

1. Field of the Invention

This invention relates to a matrix optical switch for switching the transmission path of an optical signal by connecting plural input sides to plural output sides, respectively, and particularly to a matrix optical switch that can switch the transmission path of an optical signal without requiring a driving unit for each optical switch.

2. Description of the Related Art

The current communication networks such as LANs (local area networks) and WANs (wide area networks) usually employ a communication system that transmits information on electrical signals.

A communication method of transmitting information on optical signals is used only in trunk networks for transmitting a large quantity of data and some other networks. These networks use "point-to-point" communications and have not yet developed into communication networks that can be called "photonic networks".

To realize such a "photonic network", an "optical router", an "optical switching hub" and the like that have functions similar to the functions of devices such as a router and a switching hub for switching the destination of an electrical signal are needed.

Particularly for the optical router used in trunk networks, a matrix optical switch of N×N (multiple-by-multiple) type is important, as in the current router of electrical signals. There is an optical switch having an optical waveguide formed in a semiconductor, to which carriers are injected to change the refractive index and thus switch the transmission path of an optical signal.

The following are references of the related art of the conventional matrix optical switch that switches the transmission path of an optical signal by connecting plural optical waveguides on the input side to plural optical waveguides on the output side, respectively:

JP-A-6-75179;
JP-A-8-163031;
JP-A-9-105959;
JP-A-10-308961; and
Hiroaki Inoue et al., "An 8 mm Length Nonblocking 4×4 Optical Switch Array," IEEE JOURNAL ON SELECTED AREA IN COMMUNICATIONS, Vol. 6, No. 7, p. 1262–1266 (1988).

FIG. 1 is a plan view showing an example of a part of the conventional matrix optical switch described in Hiroaki Inoue et al.

In FIG. 1, an optical waveguide 2 and an optical waveguide 3 are formed on a semiconductor substrate 1, intersecting each other. An optical waveguide 4 is formed near the intersection of the optical waveguide 2 and the optical waveguide 3 so as to connect the input side of the optical waveguide 3 to the output side of the optical waveguide 2. In carrier injection areas indicated by "IR01" and "IR02" in FIG. 1, electrodes (not shown) for injecting carriers are provided.

In the actual matrix optical switch, plural stand-along optical switches as shown in FIG. 1 are arranged to form an N×N (multiple-by-multiple) matrix optical switch.

The operation in the conventional example shown in FIG. 1 will now be described with reference to FIGS. 2 and 3. FIGS. 2 and 3 are explanatory views for explaining the operation in the conventional example shown in FIG. 1. In FIGS. 2 and 3, the semiconductor substrate 1, the optical waveguide 2, the optical waveguide 3, the optical waveguide 4 and the other elements are denoted by the same numerals and symbols as in FIG. 1.

When the optical switch shown in FIG. 1 is off, no currents are supplied from the electrodes (not shown) to the carrier injection areas indicated by "IR01" and "IR02" in FIG. 1.

Therefore, the refractive index does not change in the carrier injection areas indicated by "IR01" and "IR02" in FIG. 1. For example, as indicated by "PS11" in FIG. 2, an optical signal becomes incident from an incidence end indicated by "PI01" in FIG. 2, then travels straight through the intersection and is emitted from an emission end indicated by "PO01" in FIG. 2.

On the other hand, when the optical switch shown in FIG. 1 is on, electrons and holes are injected from the electrodes (not shown). Therefore, carriers (electrons and holes) are injected into the carrier injection areas indicated by "IR01" and "IR02" in FIG. 1.

As the refractive index is lowered in the carrier injection areas indicated by "IR01" and "IR02" in FIG. 3 by a plasma effect, for example, an optical signal indicated by "PS21" in FIG. 3 is totally reflected by the low refractive index part generated in the carrier injection area indicated by "IR01" in FIG. 3 and propagates through the optical waveguide 4 as indicated by "PS22" in FIG. 3.

Then, the optical signal indicated by "PS22" in FIG. 3 is totally reflected by the low refractive index part generated in the carrier injection area indicated by "IR02" in FIG. 3, then propagates through the optical waveguide 2 as indicated by "PS23" in FIG. 3, and is emitted from an emission end indicated by "PO02" in FIG. 3.

As a result, an N×N (multiple-by-multiple) matrix optical switch can be constructed by arranging plural optical switches each of which has a bypass-like optical waveguide formed near the intersection of two optical waveguides 2 and 3 intersecting each other so as to connect the input side of the one optical waveguide to the output side of the other optical waveguide and which propagates an optical signal through the bypass-like optical waveguide to switch the propagation path when the optical switch is on.

However, in the matrix optical switch having the plural conventional optical switches shown in FIG. 1, the following relational expression holds:

$$nc = ni \times no - 1 \qquad (1)$$

where "nc" represents the number of intersections at which the propagation path of an optical signal must be switched, "ni" represents the number of optical waveguides on the input side, and "no" represents the number of optical waveguides on the output side. Therefore, the increase in the number of optical waveguides on the input side and output side increases raises a problem that a very large number of intersections exist at which the propagation path of an optical signal must be switched.

There is also a problem that it is difficult to realize a driving unit for independently driving (i.e., injecting carriers) the individual electrodes arranged at the very large number of intersections (i.e., the conventional optical switches as shown in FIG. 1).

SUMMARY OF THE INVENTION

It is an object of this invention to realize a matrix optical switch that switches the transmission path of an optical signal without requiring a driving unit for each optical switch.

BRIEF DESCRIPTION OF THE DRAWINGS

FIG. 8 is a plan view showing another exemplary photo mask; and

FIG. 9 is a plan view showing exemplary photo masks each of which has printed thereon a pattern of one-to-one connection between one optical waveguide on the input side and one optical waveguide on the output side.

DETAILED DESCRIPTION OF THE PREFERRED EMBODIMENTS

Figure 4:
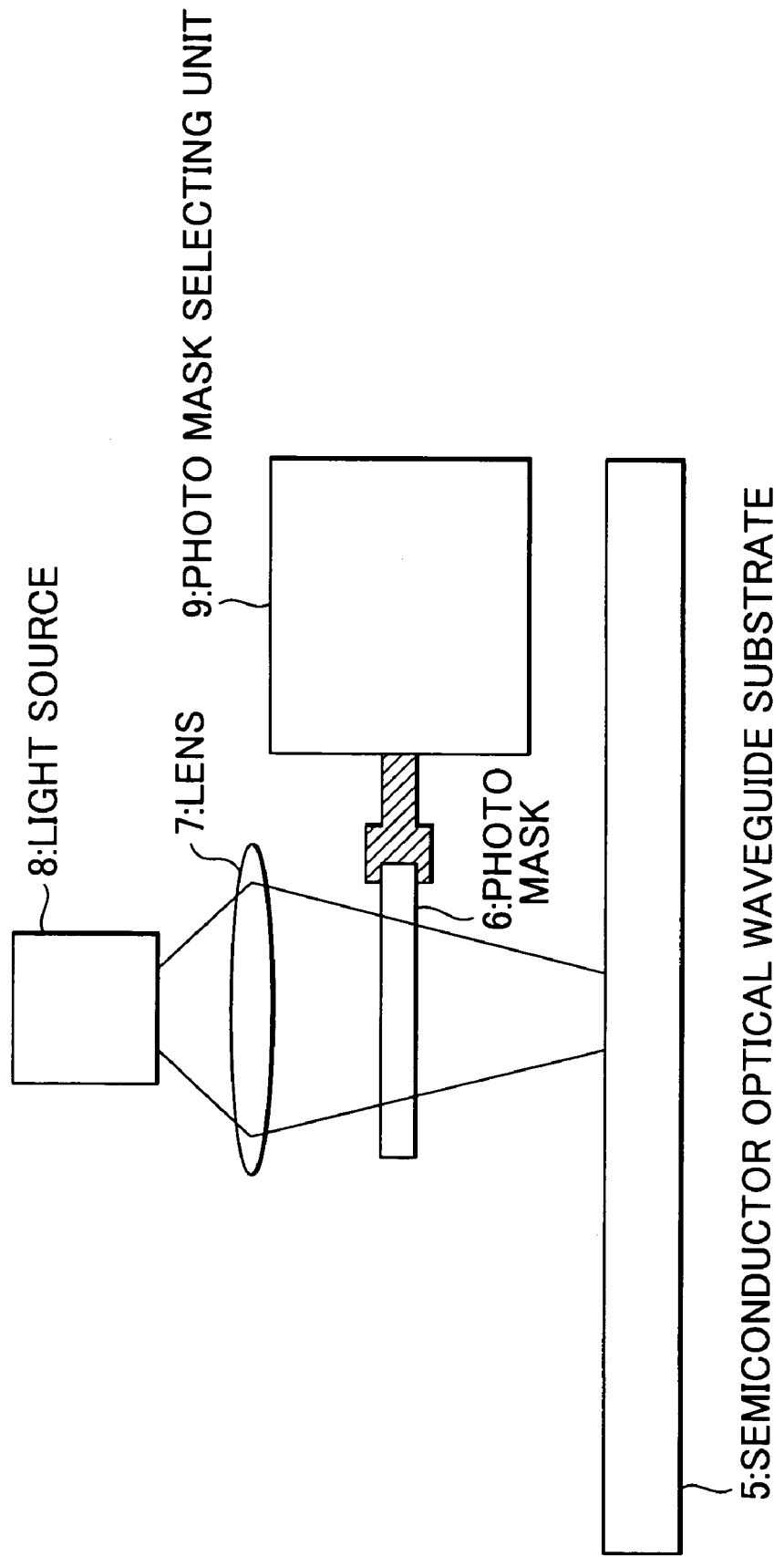
FIG. 4 is a structural block diagram showing an embodiment of a matrix optical switch according to this invention.

Hereinafter, this invention will be described in detail with reference to the drawings. FIG. 4 is a structural block diagram showing an embodiment of a matrix optical switch according to this invention.

In FIG. 4, a semiconductor optical waveguide substrate 5 is arranged, which only has plural input-side optical waveguides and plural output-side optical waveguides formed on a semiconductor in advance. Above the semiconductor optical waveguide substrate 5, a photo mask 6 which is formed in advance on a quartz glass or the like and on which a pattern connecting the input-side optical waveguides and the output-side optical waveguides is printed, is held by a photo mask choosing system 9 that selects and arranges a photo mask from plural photo masks prepared in a photo mask folder (not shown) in advance.

On the side opposite to the semiconductor optical waveguide substrate 5 as viewed from the photo mask 6, a light source 8 for casting light having larger energy than the band gap of the semiconductor optical waveguide substrate 5 is arranged. A condensing lens 7 as an optical system is arranged between the photo mask 6 and the light source 8.

Figure 5:
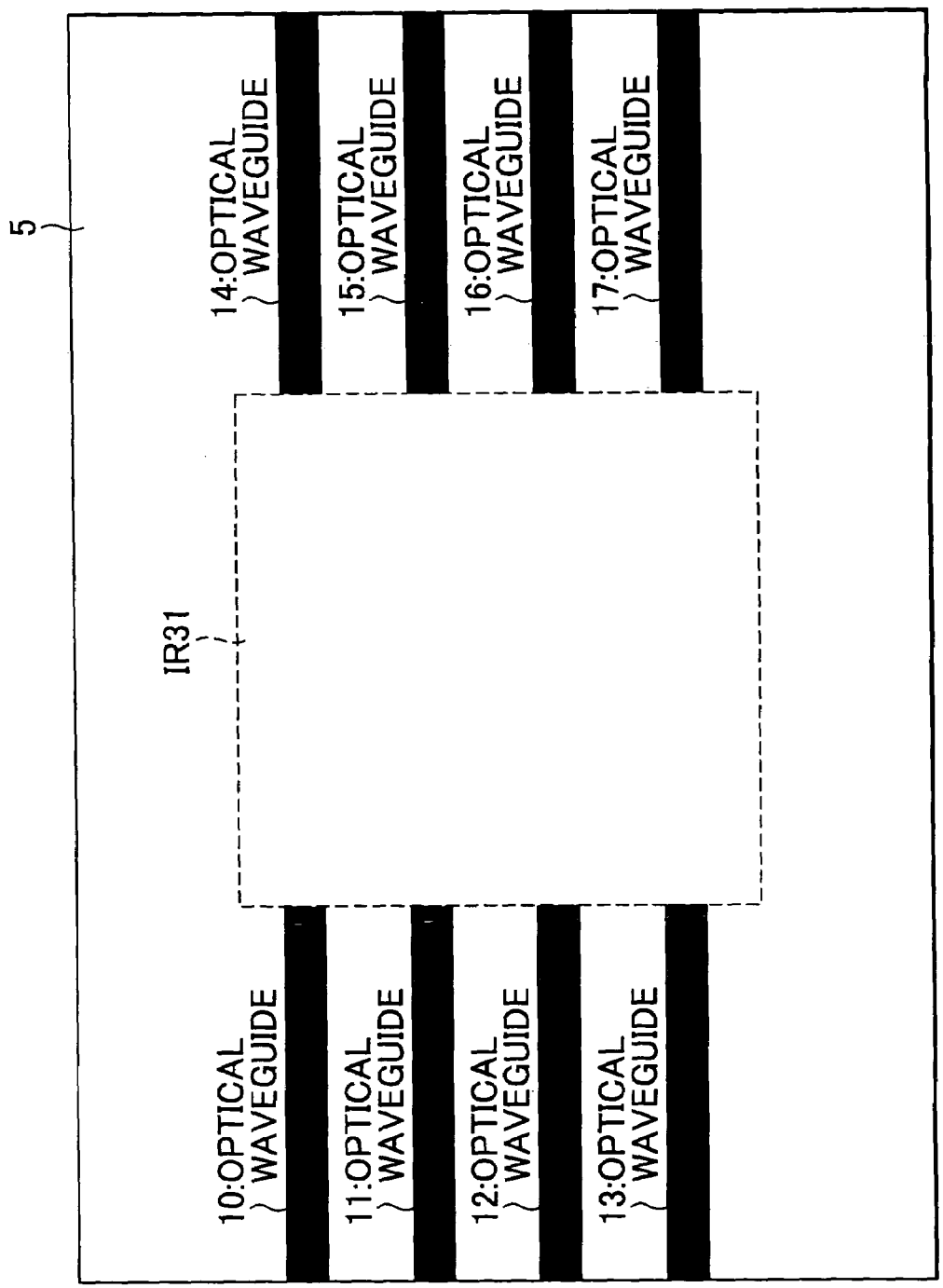
FIG. 5 is a plan view showing an exemplary semiconductor optical waveguide substrate.
Figure 6:
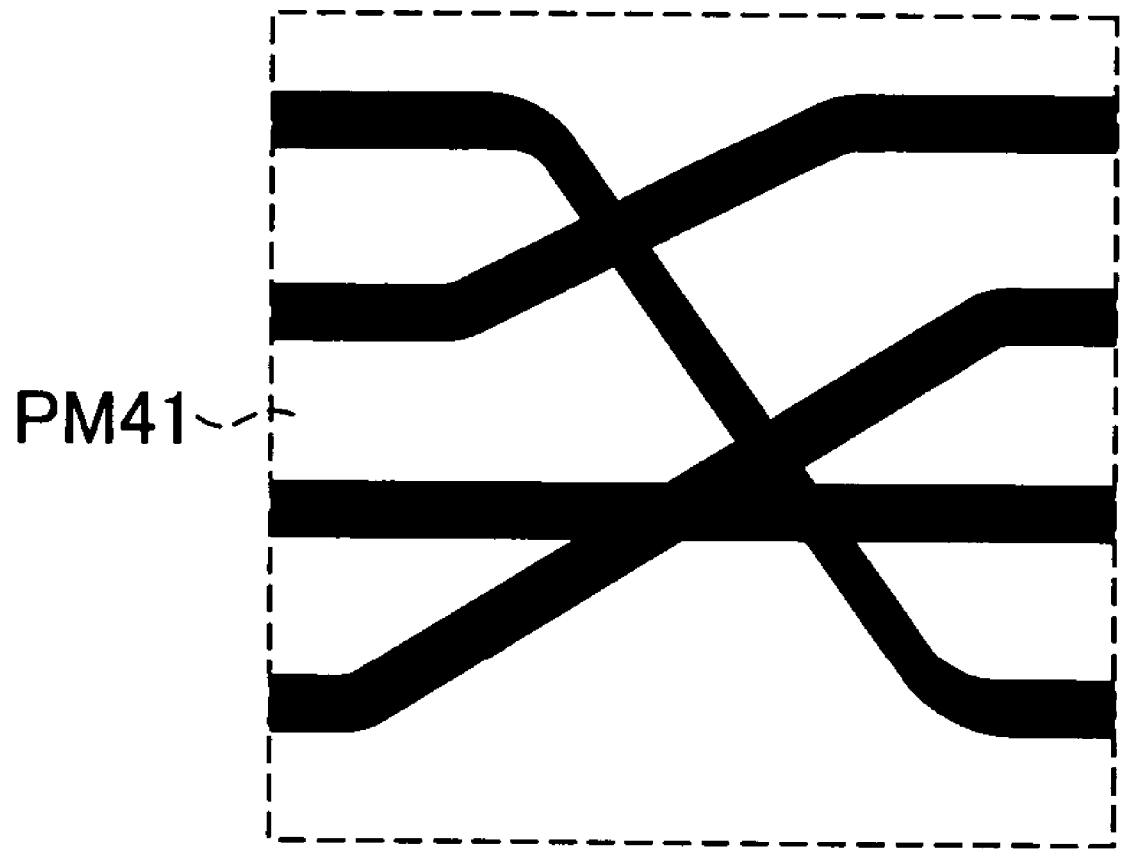
FIG. 6 is a plan view showing an exemplary photo mask.
Figure 7:
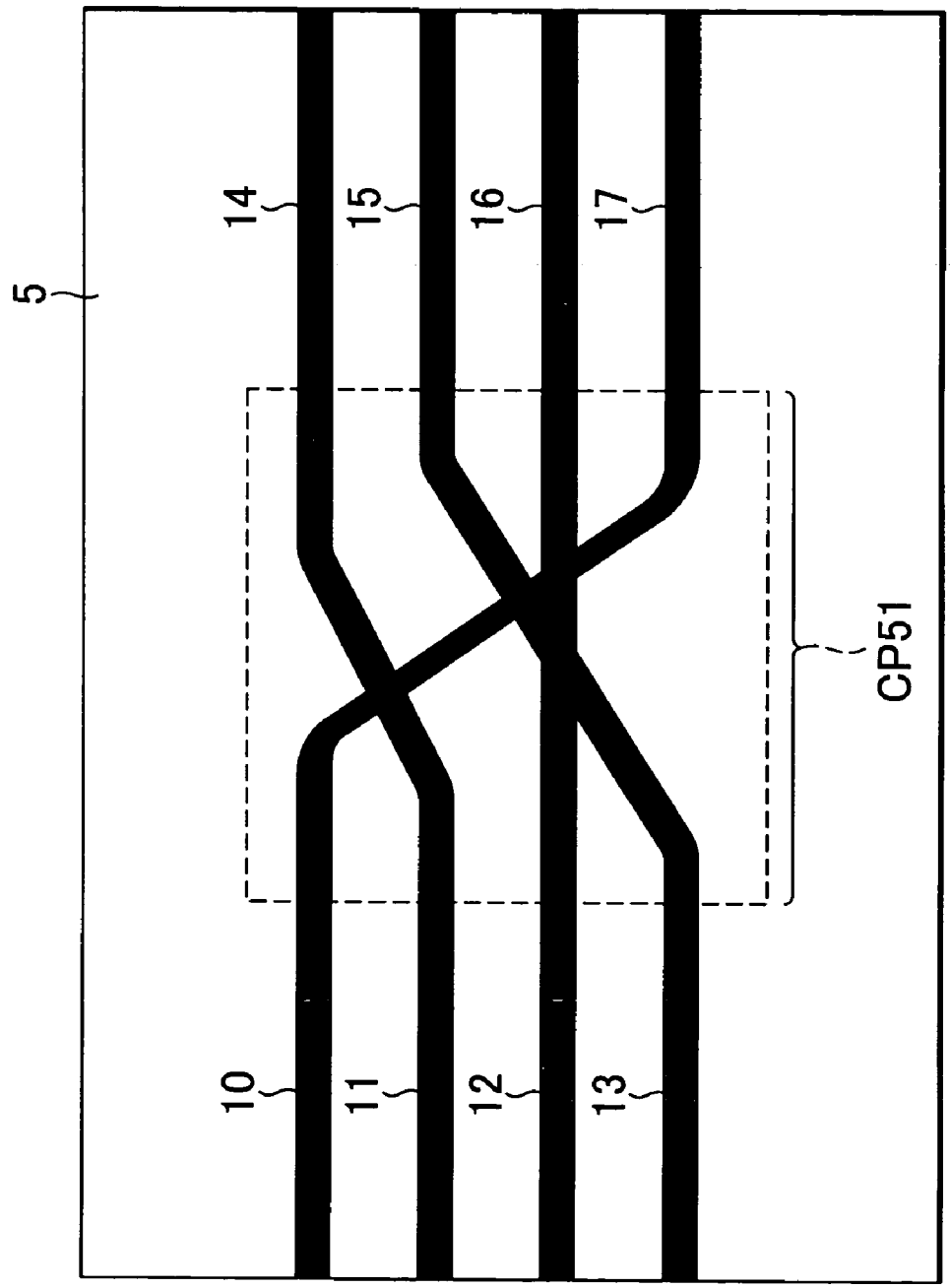
FIG. 7 is a plan view showing an exemplary state where an optical waveguide for connection is formed by irradiation with output light.

The operation in the embodiment shown in FIG. 4 will now be described with reference to FIGS. 5, 6, 7 and 8. FIG. 5 is a plan view showing an example of the semiconductor optical waveguide substrate 5. FIG. 6 is a plan view showing an example of the photo mask 6. FIG. 7 is a plan view showing an exemplary state where an optical waveguide for connection is formed by irradiation with output light. FIG. 8 is a plan view showing another example of the photo mask 6.

Figure 1:
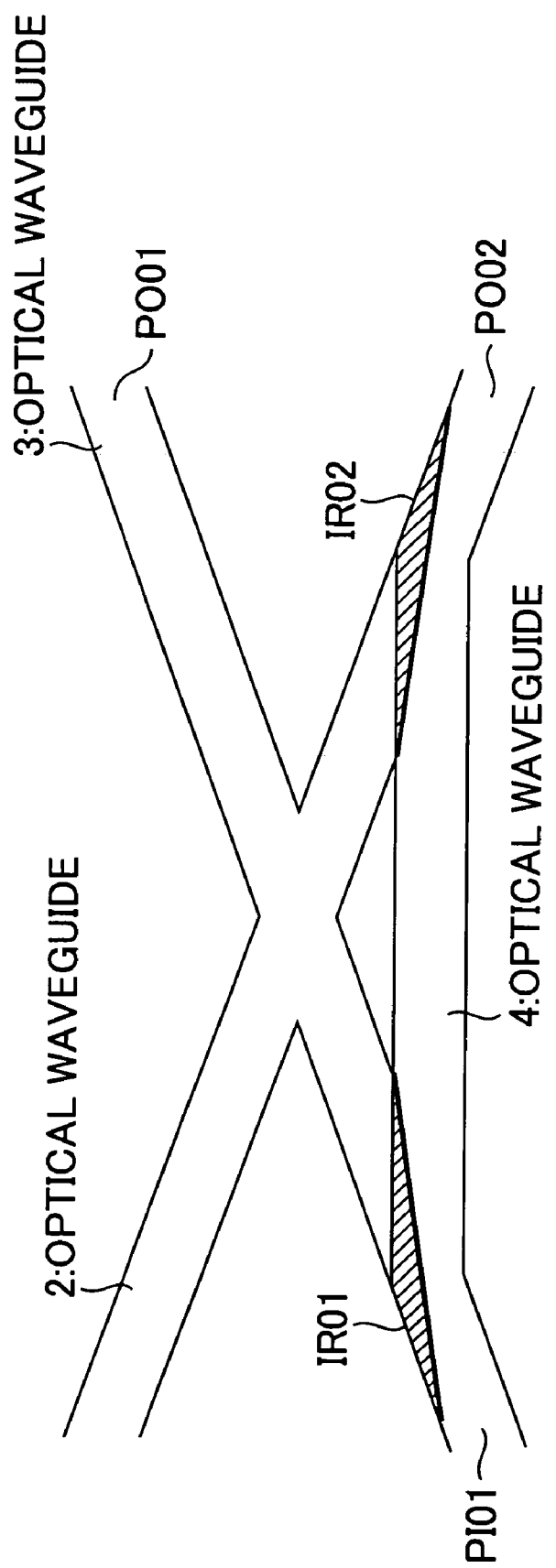
FIG. 1 is a plan view showing an example of a part of a conventional matrix optical switch.
Figure 2:
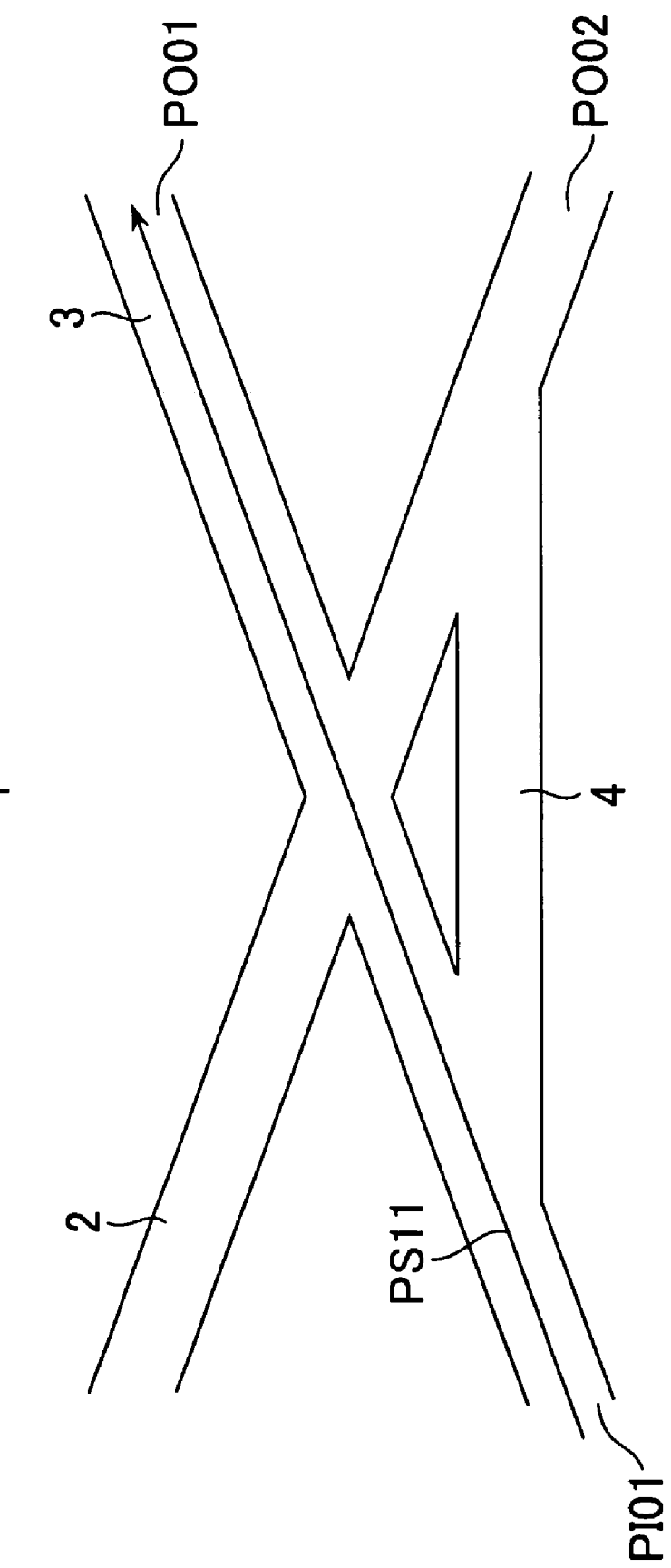
FIG. 2 is an explanatory view for explaining the operation in the conventional example.
Figure 3:
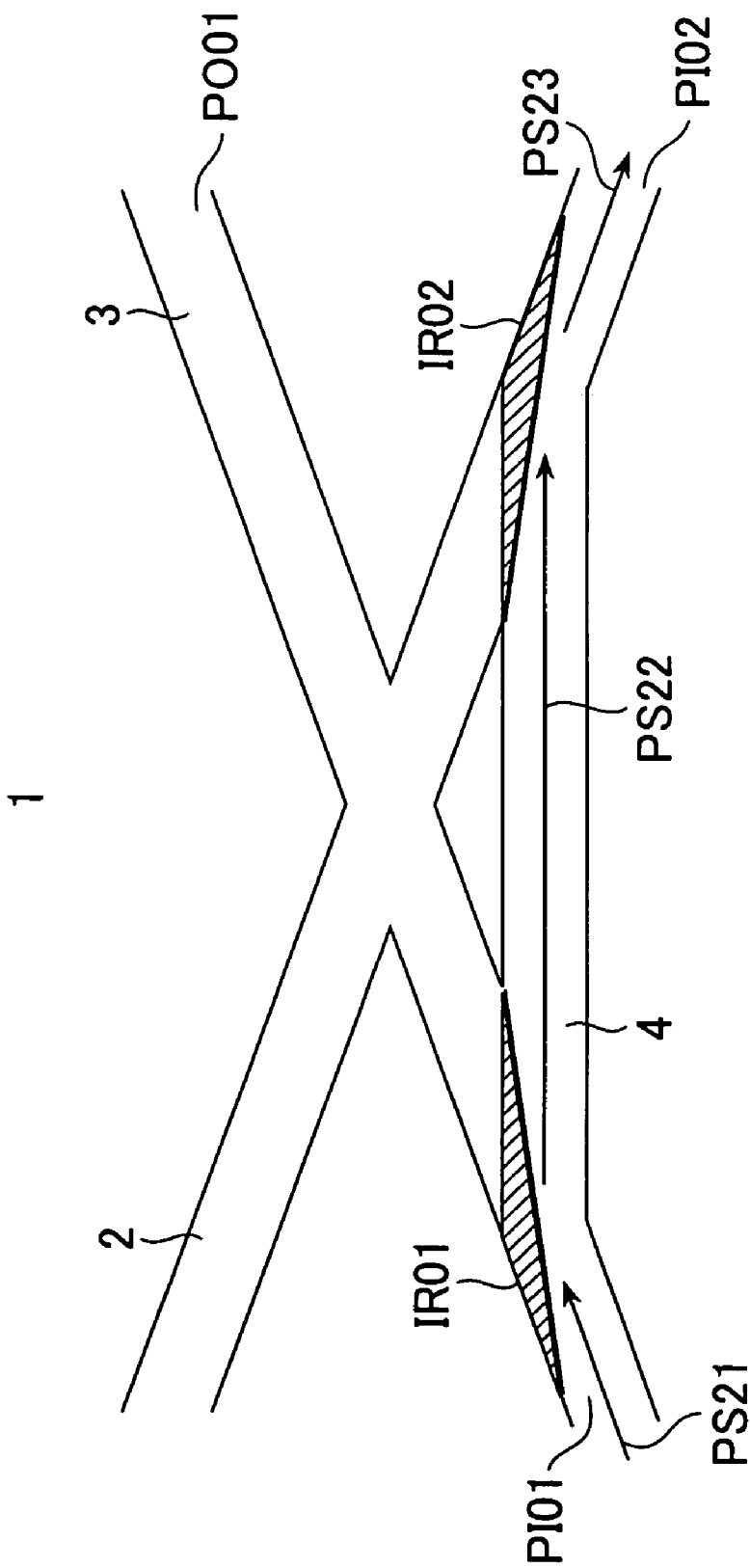
FIG. 3 is an explanatory view for explaining the operation in the conventional example.

In FIG. 5, the semiconductor optical waveguide substrate 5 is denoted by the same numeral as in FIG. 1. On the semiconductor optical waveguide substrate 5, input-side and output side optical waveguide 10, optical waveguide 11, optical waveguide 12, optical waveguide 13, optical waveguide 14, optical waveguide 15, optical waveguide 16 and optical waveguide 17 are formed in advance.

In FIG. 7, the semiconductor optical waveguide substrate 5 is denoted by the same numeral as in FIG. 1, and the optical waveguide 10, optical waveguide 11, optical waveguide 12, optical waveguide 13, optical waveguide 14, optical waveguide 15, optical waveguide 16 and optical waveguide 17 are denoted by the same numerals as in FIG. 5.

Output light of the light source 8 is condensed by the lens 7. A part of the output light is interrupted by the pattern printed on the photo mask 6 selected by the photo mask choosing system 9 from the plural photo masks prepared in advance in the photo mask folder (not shown). The light transmitted through the photo mask 6 is cast onto a carrier injection area between the input-side optical waveguides and the output-side optical waveguides formed in advance on the semiconductor optical waveguide substrate 5 (i.e., an area where no optical waveguide is formed).

The output light of the light source 8 transmitted through the photo mask 6 is cast onto, for example, a carrier injection area equivalent to the area where the optical waveguides are not formed, between the input-side optical waveguide 10, optical waveguide 11, optical waveguide 12 and optical waveguide 13, and the output-side optical waveguide 14, optical waveguide 15, optical waveguide 16 and optical waveguide 17, as indicated by "IR31" in FIG. 5.

At this point, if light that is not interrupted by the photo mask 6 and has larger energy than the band gap of the semiconductor optical waveguide substrate 5 is cast onto the carrier injection area as indicated by "IR31" in FIG. 5, carriers are generated in the carrier injection area as indicated by "IR31" in FIG. 5 and the refractive index in this area is lowered.

On the other hand, in the area where the output light of the light source 8 is interrupted by the photo mask 6, the refractive index does not change and the refractive index is relatively higher than in the area on which the output light of the light source 8 is cast. Therefore, the area where the output light of the light source 8 is interrupted by the photo mask 6 is the optical waveguide.

When, for example, a photo mask on which a pattern as indicated by "PM41" in FIG. 6 is printed is selected by the photo mask choosing system 9, optical waveguides corresponding to the solid lines (black lines) in the pattern "MP41" in FIG. 6 are formed in the carrier injection area indicated by "IR31" in FIG. 5, and the carrier injection area thus has optical waveguides as shown in FIG. 7.

Specifically, in the carrier injection area on the semiconductor optical waveguide substrate 5, optical waveguides as indicated by "CP51" in FIG. 7 are formed. Thus, the input-side optical waveguide 10 is connected to the output-side optical waveguide 17. The input-side optical waveguide 11 is connected to the output-side optical waveguide 14. The input-side optical waveguide 12 is connected to the output-side optical waveguide 16. The input-side optical waveguide 13 is connected to the output-side optical waveguide 15.

When, for example, a photo mask on which a pattern as indicated by "PM61" in FIG. 8 is printed is selected by the photo mask choosing system 9, optical waveguide corresponding to the solid lines (black lines) in the pattern "PM61" in FIG. 8 are formed in the carrier injection area indicated by "IR31" in FIG. 5.

Specifically, in the carrier injection area on the semiconductor optical waveguide substrate 5, optical waveguides corresponding to the solid lines (black lines) in the pattern "PM61" in FIG. 8 are formed. Thus, the input-side optical waveguide 10 is connected to the output-side optical waveguide 15. The input-side optical waveguide 11 is connected to the output-side optical waveguide 16. The input-side optical waveguide 12 is connected to the output-side optical waveguide 17. The input-side optical waveguide 13 is connected to the output-side optical waveguide 14.

When, for example, a photo mask on which a pattern as indicated by "PM62" in FIG. 8 is printed is selected by the photo mask choosing system 9, optical waveguide corresponding to the solid lines (black lines) in the pattern "PM62" in FIG. 8 are formed in the carrier injection area indicated by "IR31" in FIG. 5.

Specifically, in the carrier injection area on the semiconductor optical waveguide substrate 5, optical waveguides corresponding to the solid lines (black lines) in the pattern "PM62" in FIG. 8 are formed. Thus, the input-side optical waveguide 10 is connected to the output-side optical waveguide 14. The input-side optical waveguide 11 is connected to the output-side optical waveguide 16. The input-side optical waveguide 12 is connected to the output-side optical waveguide 15. The input-side optical waveguide 13 is connected to the output-side optical waveguide 17.

When, for example, a photo mask on which a pattern as indicated by "PM63" in FIG. 8 is printed is selected by the photo mask choosing system 9, optical waveguide corresponding to the solid lines (black lines) in the pattern "PM63" in FIG. 8 are formed in the carrier injection area indicated by "IR31" in FIG. 5.

Specifically, in the carrier injection area on the semiconductor optical waveguide substrate 5, optical waveguides corresponding to the solid lines (black lines) in the pattern "PM63" in FIG. 8 are formed. Thus, the input-side optical waveguide 10 is connected to the output-side optical waveguide 15. The input-side optical waveguide 11 is connected to the output-side optical waveguide 14. The input-side optical waveguide 12 is connected to the output-side optical waveguide 17. The input-side optical waveguide 13 is connected to the output-side optical waveguide 16.

As a result, it is possible to switch the transmission path of an optical signal without using a driving unit, by casting output light having larger energy than the band gap of the semiconductor optical waveguide substrate 5, transmitted through the photo mask 6 on which a pattern connecting the input-side optical waveguides to the output-side optical waveguides is printed, onto the part between the input-side optical waveguides and the output-side optical waveguide on the semiconductor optical waveguide substrate 5 where no optical waveguide is formed, so as to form optical waveguides based on carrier injection, and by properly selecting the printed pattern on the photo mask 6.

In the embodiment shown in FIGS. 4 to 8, one photo mask on which a pattern connecting all the input-side optical waveguide and output-side optical waveguides is used for each transmission path switching pattern. However, the pattern connecting all the input-side optical waveguides and output-side optical waveguides maybe realized by superimposing plural photo masks each of which has printed thereon a pattern of one-to-one connection between one input-side optical waveguide and one output-side optical waveguide.

FIG. 9 is a plan view showing exemplary photo masks each of which has printed thereon a pattern of one-to-one connection between one input-side optical waveguide and one output-side optical waveguide.

For example, to realize a pattern connecting all the input-side optical waveguides and output-side optical waveguides like the pattern printed on the photo mask as indicated by "PM41" in FIG. 6, photo masks indicated by "PM71", "PM72", "PM73" and "PM74" in FIG. 9 can be superimposed on each other.

The photo masks indicated by "PM71" to "PM74" in FIG. 9 are used to realize the pattern not only one printed on the photo mask indicated by "PM41" in FIG. 6 but also other patterns of connection.

For example, when a photo mask on which a pattern connecting all the input-side optical waveguide and output-side optical waveguides is printed is used for each transmission path switching pattern in a 4×4 matrix optical switch, 24 ($_4P_4=4\times3\times2\times1$) photo masks are necessary.

On the other hand, when plural photo masks are superimposed each of which has printed thereon a pattern of one-to-one connection between one input-side optical waveguide and one output-side optical waveguide, any of the four output-side optical waveguides can be selected for each of the four input-side optical waveguides. Therefore, only 16 (=4×4) photo masks are necessary.

In this case, the number of photo masks that must be prepared in the photo mask folder can be reduced, compared with the case of using the photo mask on which the pattern connecting all the input-side optical waveguides and output-side optical waveguides is printed for each transmission path switching pattern.

In the embodiment shown in FIG. 4, the technique for projecting a pattern to be cast onto the semiconductor optical waveguide substrate 5 is not described at all. However, a contracted projection system can be used when fine optical waveguide patterns are needed, and an equal-size projection system or an enlarged projection system may be used when necessary. Therefore, the condensing lens 7 as the optical system is not an essential constituent element.

In the embodiment shown in FIG. 4, the photo mask 6 which is formed on a quartz glass or the like and on which the pattern connecting the input-side optical waveguides to the output-side optical waveguides is printed, is described as an example. However, the optical waveguide pattern may be formed by using a liquid crystal photo mask and electrical signals from a pattern generator unit.

In this case, the photo mask 6 and the photo mask choosing system 9 are no longer necessary and the time for replacing the photo mask is not required. Therefore, a relatively dynamic operation is possible.

In the embodiment shown in FIG. 4, the output light of the light source, transmitted through the photo mask, is cast onto the semiconductor optical waveguide substrate 5. However, plural surface emission lasers may be arranged in an array and the light sources (plural surface emission lasers) are enabled to change emission patterns by themselves to cast necessary optical waveguide patterns onto the semiconductor optical waveguide substrate 5.

Also in this case, the photo mask 6 and the photo mask choosing system 9 are no longer necessary and the time for replacing the photo mask is not required. Therefore, a relatively dynamic operation is possible.

In the embodiment shown in FIG. 4, the material of the semiconductor optical waveguide substrate 5 is not described at all. However, any semiconductor material may be used, such as an AlGaAs-based semiconductor material, an InGaAsP-based semiconductor material, or a SiGe-based semiconductor material.

In the embodiment shown in FIG. 4, the structure of the semiconductor optical waveguide substrate 5 in the carrier injection area as indicated by "IR31" in FIG. 6 is not described at all. However, a structure having hetero junction or a double hetero structure is desired because it can effectively accumulate carriers.

In the embodiment shown in FIG. 4 and the like, since the optical waveguides themselves can be arbitrarily rewritten, optical waveguide functional devices such as an optical coupler, an optical splitter and a directional optical coupler can be formed.

In the embodiment shown in FIG. 5, to simplify the description, the input-side and output-side optical waveguides have been formed in advance on the semiconductor optical waveguide substrate 5. However, the transmission path of an optical signal may be switched without using any driving unit, by directly coupling plural optical fibers (plural input-side optical fibers and plural output-side optical fibers) to the semiconductor optical waveguide substrate 5, then casting output light having larger energy than the band gap of the semiconductor optical waveguide substrate 5, transmitted through a photo mask having a pattern connecting the plural optical fibers printed on the semiconductor optical waveguide substrate 5, onto the semiconductor optical waveguide substrate 5 between the plural input-side optical fibers and the plural output-side optical fibers so as to form optical waveguides based on carrier injection, and properly selecting the printed pattern on the photo mask 6.

This invention has the following effects. As output light having larger energy than the band gap of the semiconductor optical waveguide substrate, transmitted through the photo mask on which a pattern connecting input-side optical waveguides to output-side optical waveguides is printed, is cast onto the part between the input-side optical waveguides and the output-side optical waveguides on the semiconductor optical waveguide substrate where no optical waveguide is formed so as to form optical waveguides based on carrier injection, and the printed pattern on the photo mask is properly selected, the transmission path of an optical signal can be switched without requiring any driving unit.

As plural photo masks are superimposed each of which has printed thereon a pattern of one-to-one connection between one input-side optical waveguide and one output-side optical waveguide so as to realize a pattern connecting all the input-side optical waveguides and output-side optical waveguides, the number of photo masks that must be prepared in advance can be reduced, compared with the case of using a photo mask on which a pattern connecting all the input-side optical waveguides and output-side optical waveguides is printed for each transmission path switching pattern.

Moreover, as optical waveguide patterns are formed by using a liquid crystal photo mask and electrical signals from a pattern generator unit, the photo mask and the photo mask choosing system are no longer necessary and the time for replacing the photo mask is not required. Therefore, a relatively dynamic operation is possible.

Furthermore, as plural surface emission lasers are arranged in an array and the light sources (plural surface emission lasers) are enabled to change the emission patterns by themselves so as to cast a necessary optical waveguide pattern onto the semiconductor optical waveguide substrate, the photo mask and the photo mask choosing system are no longer necessary and the time for replacing the photo mask is not required. Therefore, a relatively dynamic operation is possible.

What is claimed is:

1. A matrix optical switch for switching a transmission path of an optical signal by connecting plural input sides and plural output sides, respectively, the matrix optical switch comprising:
    a semiconductor optical waveguide substrate;
    a photo mask choosing system for selecting and arranging one photo mask from plural photo masks each of which has printed thereon a pattern connecting plural input sides to plural output sides; and
    a light source for casting output light having larger energy than a band gap of the semiconductor optical waveguide substrate onto a photon injection area between the plural input sides and the plural output sides on the semiconductor optical waveguide substrate via the selected photo mask.

2. The matrix optical switch as claimed in claim 1, wherein a pattern connecting all the plural input sides and plural output sides is printed on the photo mask.

3. The matrix optical switch as claimed in claim 1, wherein a pattern of one-to-one connection between one of the input sides and one of the output sides is printed on the photo mask.

4. The matrix optical switch as claimed in claim 3, wherein the photo mask choosing system superimposes and thus arranges plural said photo masks.

5. The matrix optical switch as claimed in one of claims 1 to 4, wherein a contracted projection system is used to contract the pattern and thus cast the pattern onto the photon injection area.

6. The matrix optical switch as claimed in one of claims 1 to 4, wherein an equal-size projection system is used to cast the pattern of equal size onto the photon injection area.

7. The matrix optical switch as claimed in one of claims 1 to 4, wherein an enlarged projection system is used to enlarge the pattern and thus cast the pattern onto the photon injection area.

8. A matrix optical switch for switching a transmission path of an optical signal by connecting plural input sides and plural output sides, respectively, the matrix optical switch comprising:
    a semiconductor optical waveguide substrate;
    a liquid crystal photo mask;
    a pattern generator unit for applying an electrical signal to the liquid crystal photo mask to form a pattern connecting the plural input sides and the plural output sides; and
    a light source for casting output light having larger energy than a band gap of the semiconductor optical waveguide substrate onto a photon injection area between the plural input sides and plural output sides on the semiconductor optical waveguide substrate via the liquid crystal photo mask.

9. A matrix optical switch for switching a transmission path of an optical signal by connecting plural input sides and plural output sides, respectively, the matrix optical switch comprising:
    a semiconductor optical waveguide substrate; and
    a light source having plural surface emission lasers in an array having output light of larger energy than a band gap of the semiconductor optical waveguide substrate, changing emission patterns of the individual surface emission lasers, thereby emitting light of a pattern connecting the plural input sides and the plural output sides, and casting the light onto a photon injection area between the plural input sides and the plural output sides on the semiconductor optical waveguide substrate.

10. The matrix optical switch as claimed in one of claims 1 to 4, 8, and 9, wherein the semiconductor optical waveguide substrate is made of an AlGaAs-based semiconductor material.

11. The matrix optical switch as claimed in one of claims 1 to 4, 8, and 9, wherein the semiconductor optical waveguide substrate is made of an InGaAsP-based semiconductor material.

12. The matrix optical switch as claimed in one of claims 1 to 4, 8, and 9, wherein the semiconductor optical waveguide substrate is made of a SiGe-based semiconductor material.

13. The matrix optical switch as claimed in one of claims 1 to 4, 8, and 9, wherein the photon injection area has a structure having hetero junction or a double hetero structure.

* * * * *